(12) United States Patent
Guesdon (10) Patent No.: US 6,315,218 B1
(45) Date of Patent: Nov. 13, 2001

(54) SUSPENSION DEVICE FOR SPRAYER BOOMS

(75) Inventor: Alain Guesdon, Noisy sur Ecole (FR)

(73) Assignee: Kuhn-Nodet, S.A., Montereau (FR)

( * ) Notice: Subject to any disclaimer, the term of this patent is extended or adjusted under 35 U.S.C. 154(b) by 0 days.

(21) Appl. No.: 09/446,103

(22) PCT Filed: Apr. 21, 1999

(86) PCT No.: PCT/FR99/00942

§ 371 Date: Dec. 22, 1999

§ 102(e) Date: Dec. 22, 1999

(87) PCT Pub. No.: WO99/53753

PCT Pub. Date: Oct. 28, 1999

(30) Foreign Application Priority Data

Apr. 22, 1998 (FR) .................................................. 98 05210

(51) Int. Cl.[7] .................................. B05B 1/20; E01H 3/02
(52) U.S. Cl. ........................... 239/159; 239/161; 239/164; 239/166; 239/167; 239/168; 239/172
(58) Field of Search ...................................... 239/146, 159, 239/161, 163, 164, 166, 167, 168, 172

(56) References Cited

U.S. PATENT DOCUMENTS 4,427,154 * 1/1984 Mercil .................................. 239/161

* cited by examiner

Primary Examiner—David A. Scherbel
(74) Attorney, Agent, or Firm—Oblon, Spivak, McClelland, Maier & Neustadt, P.C.

(57) ABSTRACT

A suspension device for a boom of a product spraying agricultural appliance includes elements for mounting the boom on a chassis of the appliance. The suspension device further includes elements to damp a boom movements and adjusting members capable of acting on the boom mounting elements so as to vary a position of a boom instantaneous center of rotation relative to a center of gravity thereof, preferably by modifying a spacing between the center of gravity and the instantaneous center of rotation located higher than the center of gravity.

20 Claims, 7 Drawing Sheets

SUSPENSION DEVICE FOR SPRAYER BOOMS

BACKGROUND OF THE INVENTION

1. Field of the Invention

The present invention relates to the technical field of mounted, trailed or self-propelled agricultural spreading appliances, and more particularly relates to agricultural spraying appliances. Such agricultural appliances are equipped with at least one boom intended to spread, as uniformly as possible, fertilizers or treatment products of the plant protection type on the ground or on crops. The relatively large dimensions of this boom mean that the mounted, trailed or self-propelled spreading appliance has to be of robust construction and appropriately suspended from the chassis.

Suspension devices advantageously allow the boom to move as the spreading appliance moves along over uneven ground. Furthermore, said suspension devices have to be capable of inclining the boom appropriately as the spreading appliance moves along over sloping terrain.

Pendular suspension devices for such booms are already known. These known suspension devices allow the boom to remain parallel to the ground as the chassis of the spreading appliance moves along over unevennesses of the ground. With such a suspension device, the boom is suspended from said chassis by a single articulation which therefore transmits to said boom the jolts which the chassis is experiencing.

There is also known a suspension device for a boom for spreading plant protection products which comprises elements for mounting said boom on a chassis to allow said boom to move with respect to said chassis.

2. Discussion of the Background

A suspension device of this kind is described, for example, in document FR 2 599 941-A1. This document specifically discloses a suspension device comprising two symmetric elements, each of which comprises:

- a connecting rod connected, by one of its ends, so that it can pivot with respect to a fixed frame supported by a carrying machine,
- a cranked swinging arm, the top of which is mounted so that it can pivot with respect to the boom, while the end of its branch pointing toward the center is articulated to the second end of the connecting rod, and
- a tension spring, the ends of which are hooked respectively onto the connecting rod and onto the end of the second branch of the swinging arm facing outward.

A suspension device of this kind exhibits drawbacks. Specifically, it would seem that said suspension device incorporates no means for damping the movements of the boom. Furthermore, it would seem impossible to alter the geometry of the suspension device and thus the dynamic behavior of the boom.

SUMMARY OF THE INVENTION

The purpose of the present invention is therefore to overcome the drawbacks of the prior art by producing a suspension device capable of damping, preferably quickly, the various oscillations to which the boom is subjected as the appliance moves along and whose damping sensitivity can be chosen according to various conditions of use.

The purpose stated to the present invention is achieved by means of a suspension device for a boom comprising elements for mounting said boom on a chassis of the product-spreading agricultural appliance, which device additionally comprises, on the one hand, means for damping the movements of the boom and, on the other hand, adjusting members capable of acting on the elements for mounting said boom so as to vary the position of the instantaneous center of rotation of said boom with respect to the center of gravity thereof, preferably by altering the separation between said center of gravity and said instantaneous center of rotation which is higher up than said center of gravity.

By virtue of a suspension device of this kind, it is possible to influence the dynamic response of the boom. Said boom suspension device may, in effect, as the user chooses, operate in a similar way to a conventional pendular system or operate in a similar way to a link rod system. One or other mode of operation or a combination of the two modes of operation may be selected according to the conditions of use encountered.

An additional purpose of the invention is to produce a boom suspension device which additionally allows the slope of the boom to be adjusted.

BRIEF DESCRIPTION OF THE DRAWINGS

Other features and advantages of the invention will emerge from the detailed description given hereinafter and made with reference to the appended drawings which are given by way of nonlimiting examples and in which.

DESCRIPTION OF THE PREFERRED EMBODIMENTS

In what follows of the description, the references mentioned in the figures are increased or decreased by a multiple of 100 when changing from one embodiment to another, in the case of elements which have been structurally and/or functionally changed. These elements do, however, retain the same denomination. References to other elements remain unchanged.

Figure 1A:
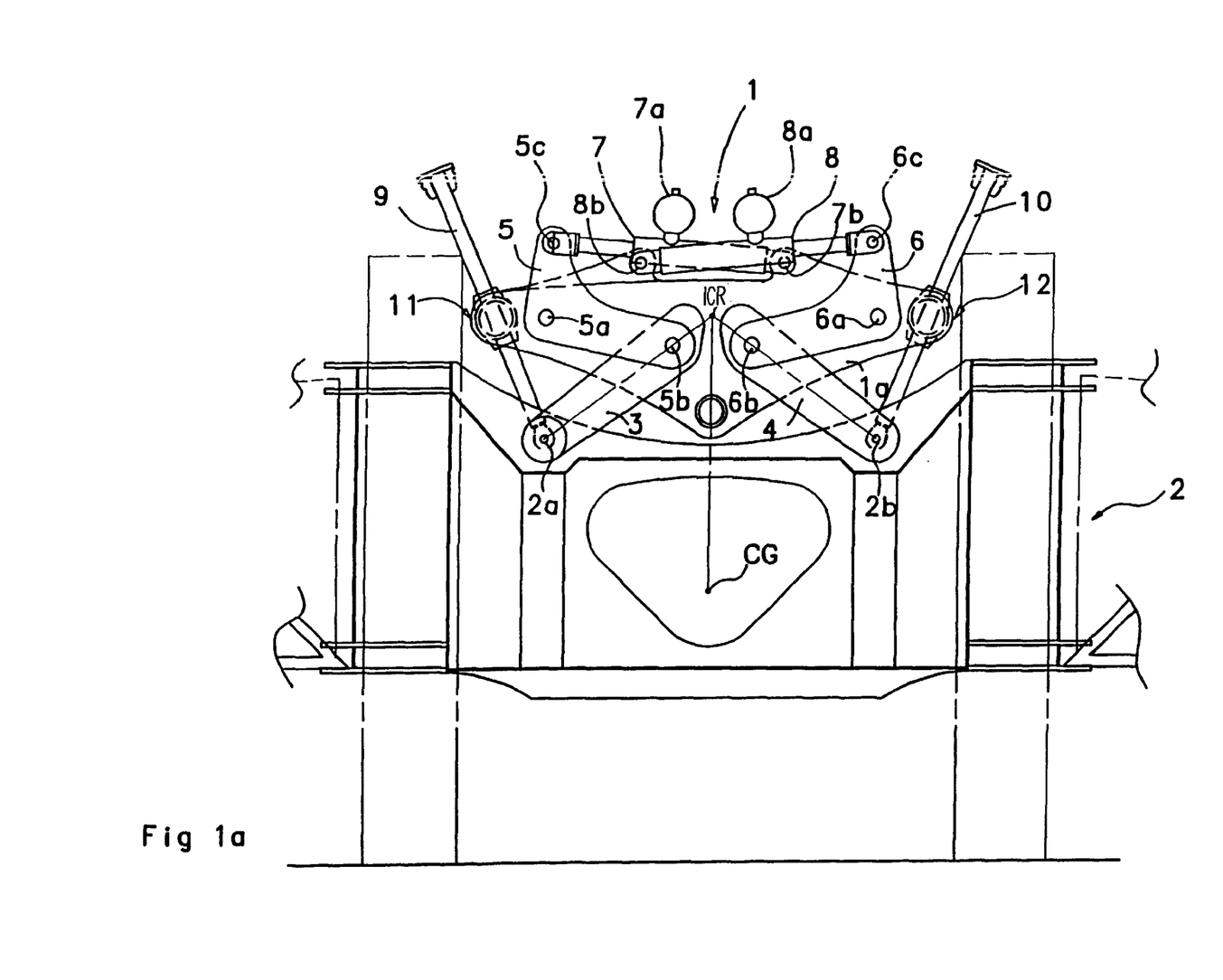
FIG. 1a depicts a partial view of a spray boom mounted on a chassis using a first embodiment of a suspension device according to the invention.

FIG. 1a depicts a first embodiment of a suspension device (1) according to the invention. The suspension device (1) allows a spray boom (2) to be suspended and oriented, said boom (2) being shown only partially in this figure. The boom (2) is suspended from a chassis (1a) of a mounted, trailed or self-propelled sprayer. The suspension device (1) allows controlled movement of the boom (2) with respect to the chassis (1a) and, in particular, about an instantaneous center of rotation (ICR). The boom (2) has a center of gravity (CG).

The suspension device (1) first of all comprises mounting elements which embody the connection between the chassis (1a) and the boom (2). Advantageously, the mounting elements comprise two link rods (3, 4), each one articulated to the boom (2) at a point (2a, 2b) of articulation, and the upward convergence of which link rods determines the location of the instantaneous center of rotation (ICR). The mounting elements also comprise two rocker arms (5, 6), each one advantageously having a roughly cranked shape and each one being articulated to the chassis (1a) at an —approximately central—corresponding point (5a, 6a) of articulation which embodies the point about which said rocker arm (5, 6) pivots. One of the ends of each rocker arm (5, 6)—in the example depicted, the one which points toward the center of the suspension device (1a)—is articulated to the corresponding one of the link rods (3, 4) at a point (5b, 6b) of articulation, and the other end of each rocker arm (5, 6) is connected to the chassis (1a) via an adjusting member (7, 8). Each rocker arm (5, 6) is connected to the respective adjusting member (7, 8) by means of a corresponding articulation (5c, 6c).

The suspension device (1) preferably comprises two such adjusting members (7, 8) articulated to the chassis (1a) at points (7b, 8b) of articulation, respectively. In the embodiment depicted, the points (7b, 8b) of articulation are distinct from one another. In another embodiment, said adjusting members (7, 8) could, however, be articulated to the same articulation (7b, 8b) on the chassis (1a). These adjusting members (7, 8) advantageously consist of hydraulic rams. These allow the angular orientation of the link rods (3, 4) to be altered by acting on the rocker arms (5, 6). This angular alteration of the orientation of the link rods (3, 4) in fact corresponds to an alteration in the convergence of said link rods (3, 4) and thus to an alteration in the separation between the center of gravity (CG) of the boom (2) and the instantaneous center of rotation (ICR) thereof. It is thus possible to act on the sensitivity of the suspension device (1) and thus the dynamic response of the boom (2).

Figure 1B:
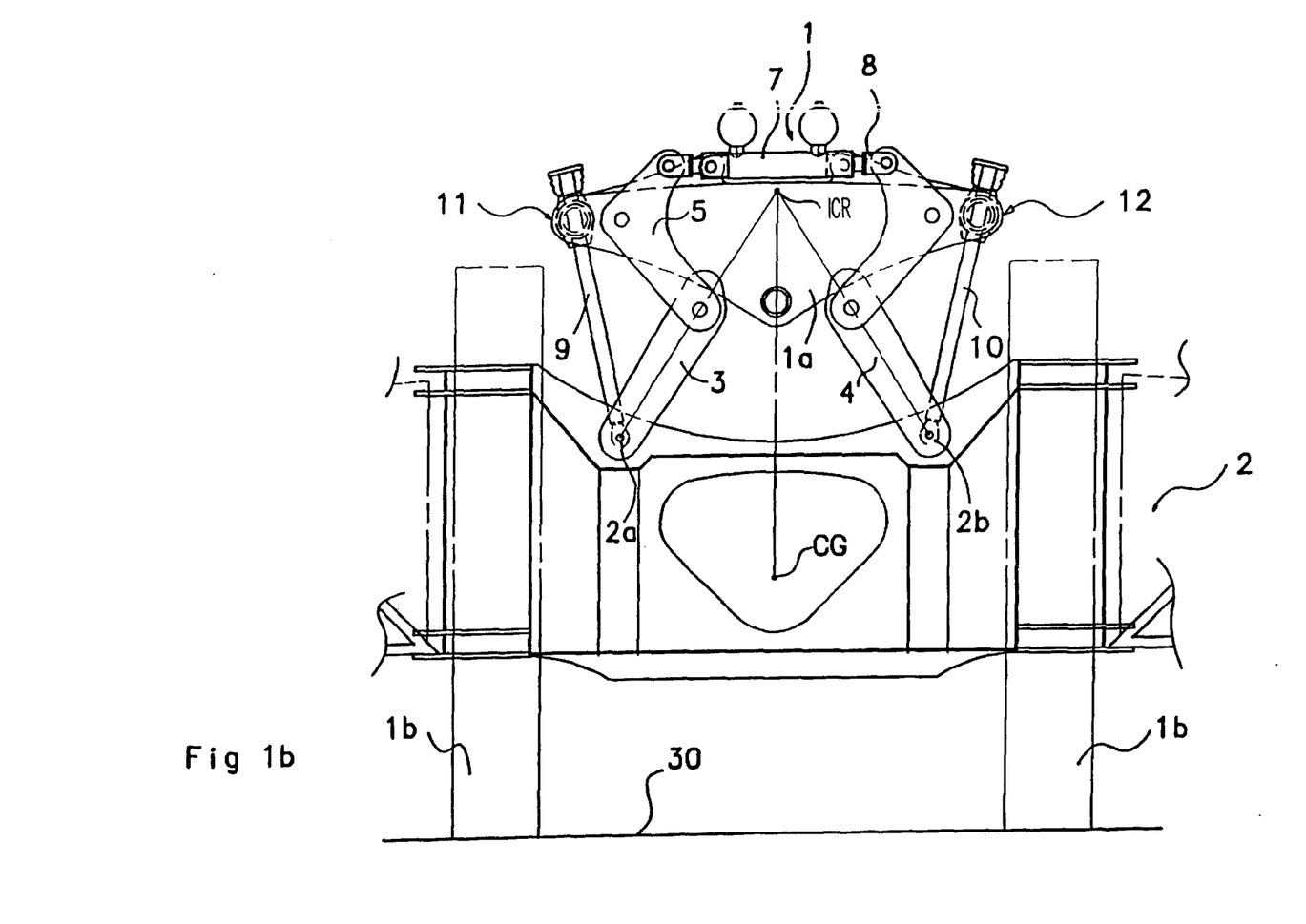
FIGS. 1b and 1c depict the boom of FIG. 1 in different conditions of use.
Figure 1C:
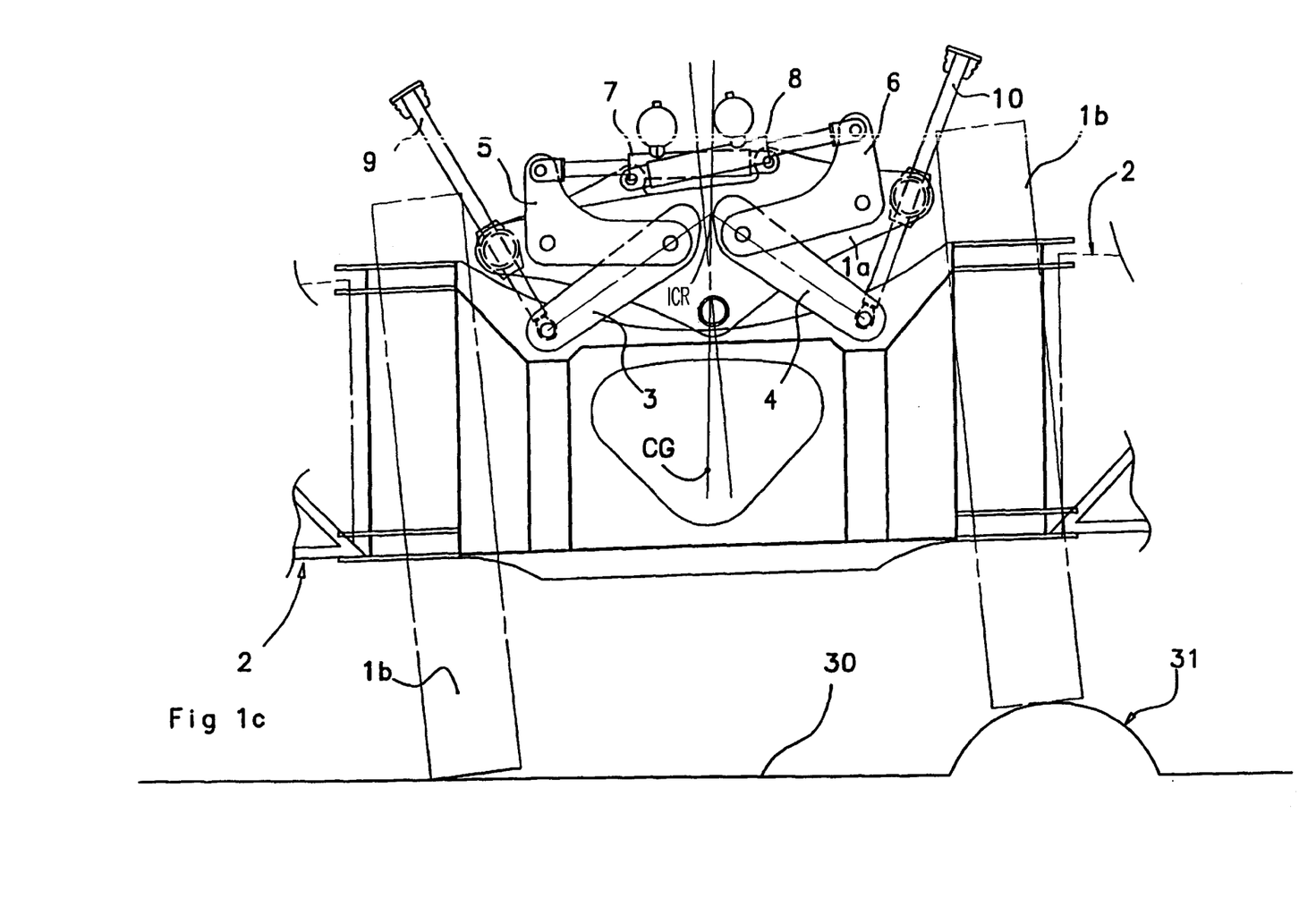
Figure 1D:
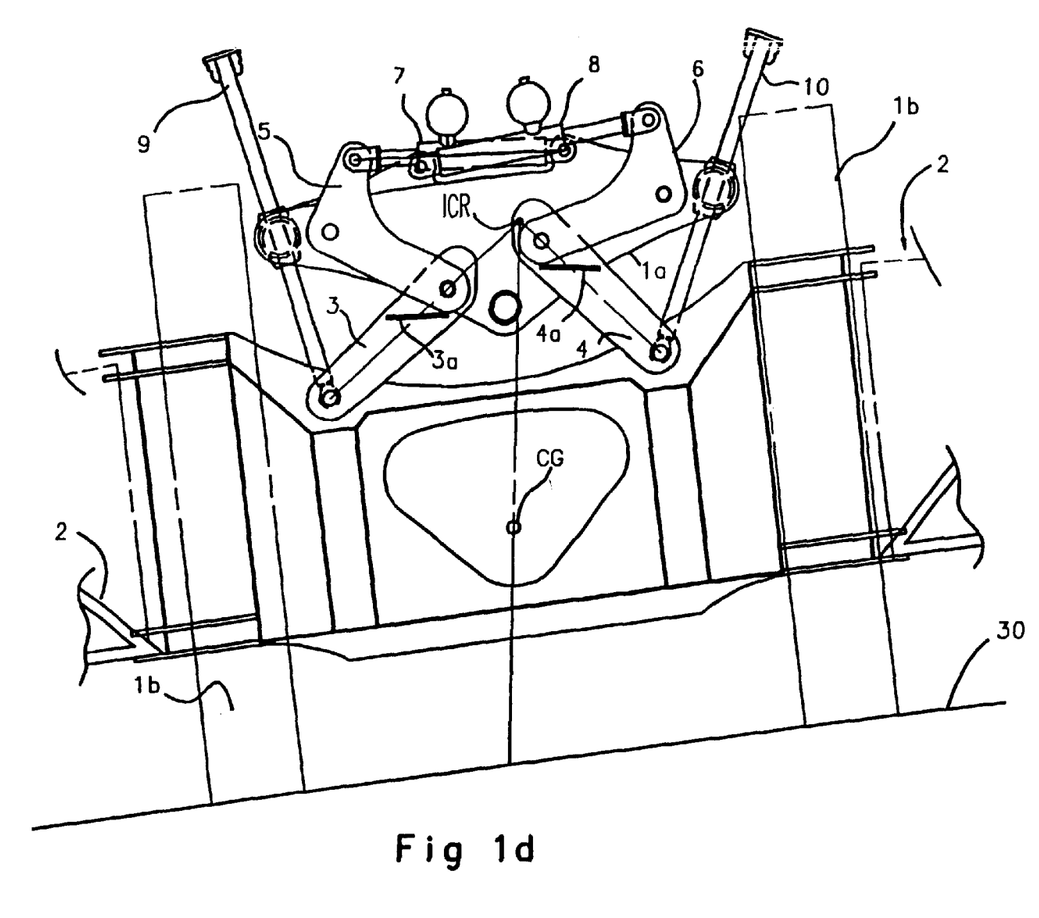
FIG. 1d depicts the boom of FIGS. 1a, 1b and 1c when moving along at a slope over sloping terrain.

The adjusting members (7, 8) are also capable of bringing the boom (2) into a given angular orientation with respect to the chassis (1a), and to do so in order to make sure that said boom (2) remains parallel to the ground (30) (FIG. 1c or 1d for example). A different extension of one of the adjusting members (7, 8) with respect to the other thus allows to act on the orientation of the boom (2). The extension of each adjusting member (7, 8) is here determined by a given stroke of the piston of the hydraulic ram which constitutes said adjusting member (7, 8).

Said hydraulic rams are also embodied in the form of oleopneumatic rams. For this purpose, these rams each have a hydropneumatic accumulator (7a, 8a). Thus, said oleopneumatic rams constitute elastically deformable means allowing the rocker arms (5, 6) to move, in pivoting, against a return force generated by said oleopneumatic rams. This return force encourages the boom (2) to return to its normal position.

Said oleopneumatic rams also constitute means for damping abrupt movements transmitted to the boom (2) via the chassis (1a).

In the embodiment depicted, the elastically deformable means and the damping means are built into the adjusting means (7, 8). Other embodiments may, however, be envisaged, without in any way departing from the scope of the present invention.

In the invention, the hydropneumatic accumulators (7a, 8a) could also be incorporated directly into the actual structure of the hydraulic rams.

FIGS. 1a to 1d, 3 and 4 also show rods (9, 10) fitted between the chassis (1a) and the boom (2). In the embodiment depicted, said rods (9, 10) are connected respectively to the articulations (2a, 2b) about which the link rods (3, 4) are articulated to the boom (2). The sliding rods (9, 10) form part of locking mechanisms (11, 12) secured to the chassis (1a) in such a way that they are able to lock the boom (2) in a given angular position with respect to said chassis (1a).

Each locking mechanism (11, 12) consists, for example, of a ram capable of preventing any sliding movement of the rod (9, 10) after the boom (2) has been placed in the desired orientation.

Automatic adjustment of the orientation of the boom (2) may also be provided. In this case, the locking means (11, 12) and the adjusting members (7, 8) are therefore actuated according to information output by sensors. Electronic means, possibly associated with a computer management system, may be used to operate the locking mechanisms (11, 12) and the adjusting members (7, 8). Other means known from the field of mechanical and electronic engineering may also supplement the locking mechanisms (11, 12) and the adjusting members (7, 8) to appropriately orientate the boom (2). Specifically these may be optical or movement, load or acceleration sensors.

The locking mechanisms (11, 12) with their rods (9, 10) thus allow the boom (2) to be locked, particularly when just half of the boom (2) is deployed. In this case, the asymmetric distribution of the weight of the boom (2) actually requires said boom (2) to be locked.

FIG. 1b depicts the boom (2) and its suspension device (1) in the position of maximum separation between the center of gravity (CG) of the boom (2) and the instantaneous center of rotation (ICR) thereof. In this position, the adjusting members (7, 8) have a minimal length corresponding to the maximum amount of shortening of the oleopneumatic rams. This shortening of said rams causes the rocker arms (5, 6) to pivot, which pivoting causes a separation between the instantaneous center of rotation (ICR) of the boom (2) and the center of gravity (CG) thereof. An upward movement of the boom (2) as a result of a vertical jolt, causes the rocker arms (5, 6) to exert tension on the adjusting members (7, 8). The use of oleopneumatic rams allows such abrupt movements to be damped.

A distance or separation between the instantaneous center of rotation (ICR) of the boom (2) and the center of gravity (CG) thereof, increases the restoring moment applied to the moving boom (2), under dynamic conditions, so as to reduce the force needed to return said boom (2) to its normal position. The positional stability of the boom (2) is thus improved.

Figure 3:
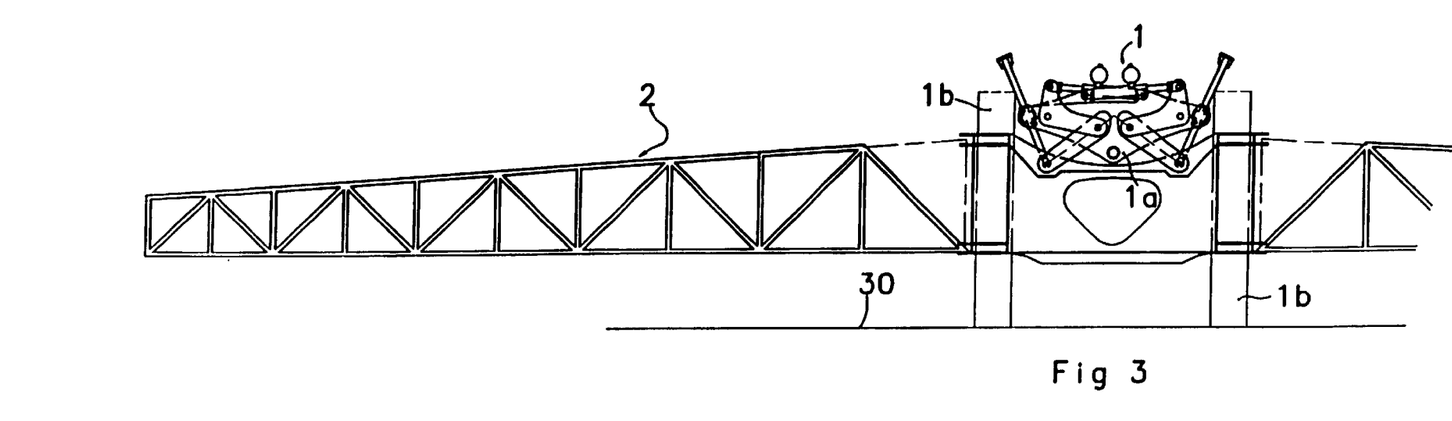
FIGS. 3 and 4 depict wider views of a spray appliance under different conditions of use, with the spray boom suspended from the chassis using the first embodiment of the suspension device according to the invention.

In FIGS. 1a, 1b and 3, it can be seen that the suspension device (1) for the boom (2) is approximately symmetrical with respect to a vertical plane directed in the direction of forward travel during work and containing the instantaneous center of rotation (ICR) of the boom (2) and the center of gravity (CG) thereof.

Figure 4:
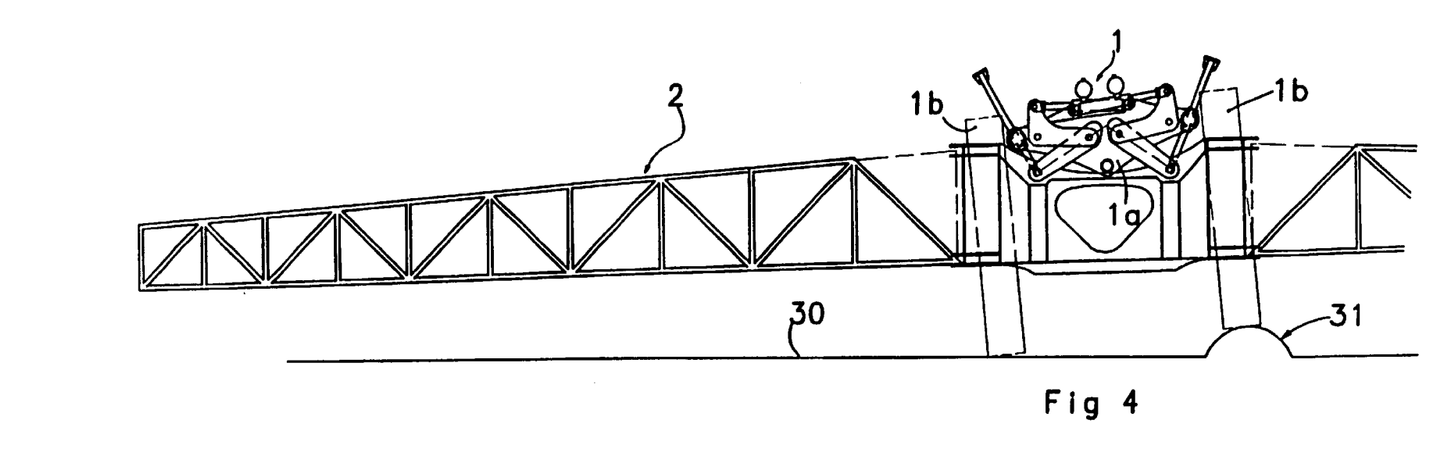

FIGS. 1c and 4 diagrammatically depict the behavior of the boom (2) and of its suspension device (1) when one of the wheels (1b) of the tractor vehicle carrying the sprayer or of the self-propelled spraying machine or alternatively of the trailed sprayer runs over a bump (31) in the ground (30). The chassis (1a) then experiences an abrupt vertical acceleration, which is damped by the suspension device (1). The latter also allows the boom (2) to remain approximately parallel to the ground (30) independently of any temporary inclination of the chassis (1a) of the sprayer.

Inclination results in a loss of symmetry between the subassembly consisting of the link rod (3), the rocker arm (5) and the adjusting member (7) and the subassembly consisting of the link rod (4), the rocker arm (6) and the adjusting member (8).

One or other of the adjusting members (7, 8) is lengthened or shortened to a greater or lesser extent, depending on the amount of inclination of the chassis (1a). It can thus be seen that, with the suspension device (1) according to the invention, the behavior is similar to that of a pendular system, without in any ay transmitting jolts or shakes to the boom (2). FIG. 1d depicts the sprayer moving along over inclined (or sloping) ground (30). By virtue of the suspension device (1) according to the invention, it is possible to keep the boom (2) parallel to said ground (30). This is achieved by having a different extension for each adjusting member (7, 8).

The imaginary straight line passing through the center of gravity (CG) of the boom (2) and the instantaneous center of rotation (ICR) thereof remains approximately orthogonal to the horizontal in spite of the inclination of the boom (2) with respect to the horizontal. Furthermore, the suspension device (1) is always able to damp and absorb lateral and vertical jolts experienced by the boom (2).

Whereas in this embodiment, the suspension device (1) is equipped with locking mechanisms (11, 12) comprising rods (9, 10), it is perfectly possible, in the context of the invention, for each link rod (3, 4) (or each rocker arm (5, 6)) to be equipped with a mechanical stop (3a, 4a) in place of these rods or in combination therewith, against which stop the corresponding rocker arm (5, 6) (or the corresponding link rod (3, 4)) can come to bear when the respective adjusting member (7, 8) is extended by a certain amount (this mechanical stop limits the angle between the link rod (3, 4) and the corresponding rocker arm (5, 6)). This makes it possible to lock the boom (2) to the chassis (1a), for example for special work or for transport by road. It is thus possible to eliminate any relative movement between the boom (2) and the chassis (1a), because the oleopneumatic rams which constitute the adjusting members (7, 8) remain under pressure at maximum extension. These mechanical stops (3a, 4a) constitute one embodiment of limiting mechanisms which allow the boom (2) to be locked in a raised position.

Figure 5:
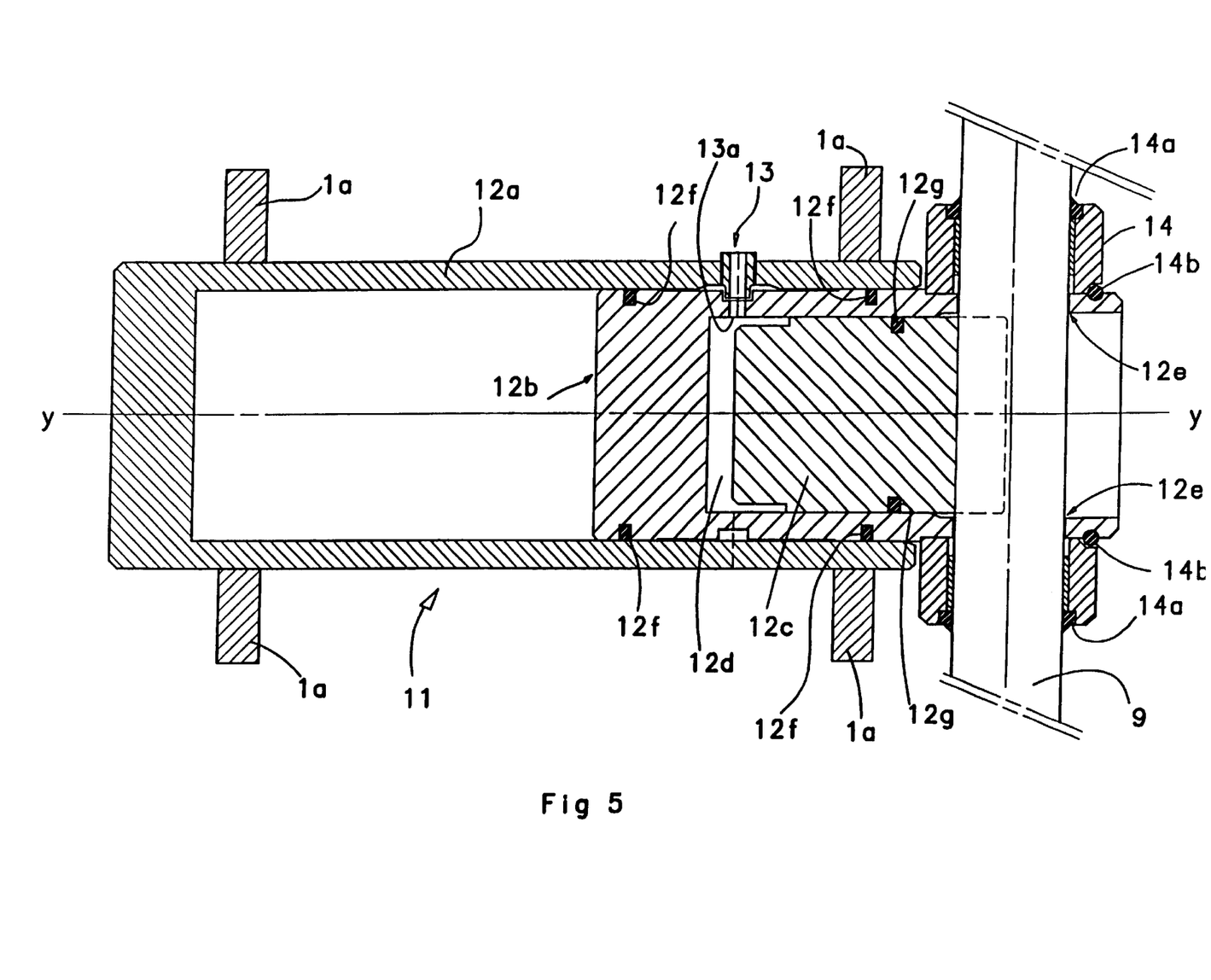
FIG. 5 depicts an embodiment of a mechanism for locking the suspension device according to the invention.

FIG. 5 depicts the locking mechanism (11) in detail. This mechanism comprises a carrying structure (12a), for example cylindrical, fixed to the chassis (1a).

This carrying structure (12a) contains a hydraulic ram (12b). The latter is fixed in the carrying structure (12a) and its piston (12c) is capable of locking the rod (9) through friction. The end of the piston (12c) which comes to bear against the rod (9) therefore has a shape which complements that of said rod (9), for example a rounded or V shape. The elements of FIG. 5, with the exception of the rod (9), are depicted in section. The hydraulic ram (12b) has a chamber (12d) in which the piston (12c) moves. Advantageously, the rod (9) passes through a bore (12e) formed in the cylinder which forms the ram (12b) so as to allow said rod (9) to slide when the ram (12b) is not under pressure.

The ram (12b) is preferably mounted inside the carrying structure (12a) by means of a positioning and oil-supplying member (13), static seals (12f) providing a seal between the carrying structure (12a) and the outside of the cylinder of said ram (12b). Said cylinder, for its part, has an opening (13a) and a groove extending over at least part of the periphery of said cylinder so as to maintain communication between the chamber (12d) and the positioning and oil-supplying member (13) during any rotation of said cylinder in the carrying structure (12a). The piston (12c) is also advantageously fitted with a seal (12g) and is free to rotate in the chamber (12d) so as to allow the end of the piston (12c) to fit perfectly against the rod (9).

The ram (12b) is also associated with a piece (14) for guiding the rod (9) fitted with seals (14a) providing the seal with the rod (9) which slides in said guide piece (14). The latter is also mounted on the cylinder of the ram (12b) in such a way as to be positioned between a shoulder of the cylinder of the ram (12b) and an elastic ring (14b) mounted on the free end of said cylinder of the ram (12b). Thus, when the chamber (12d) of the ram (12b) is under pressure, the guide piece (14) bears against the elastic ring (14b) under the effect of the pressure exerted by the piston (12c) on the rod (9). By contrast, when the pressure inside the chamber (12d) of the ram (12b) drops, the piston (12c) no longer presses against the rod (9). The latter is therefore released and is then able to slide inside the guide piece (14).

Now that the locking mechanism (11) has just been described in detail, it will be understood that the locking mechanism (12) is entirely similar which means it will not be described here.

Figure 2:
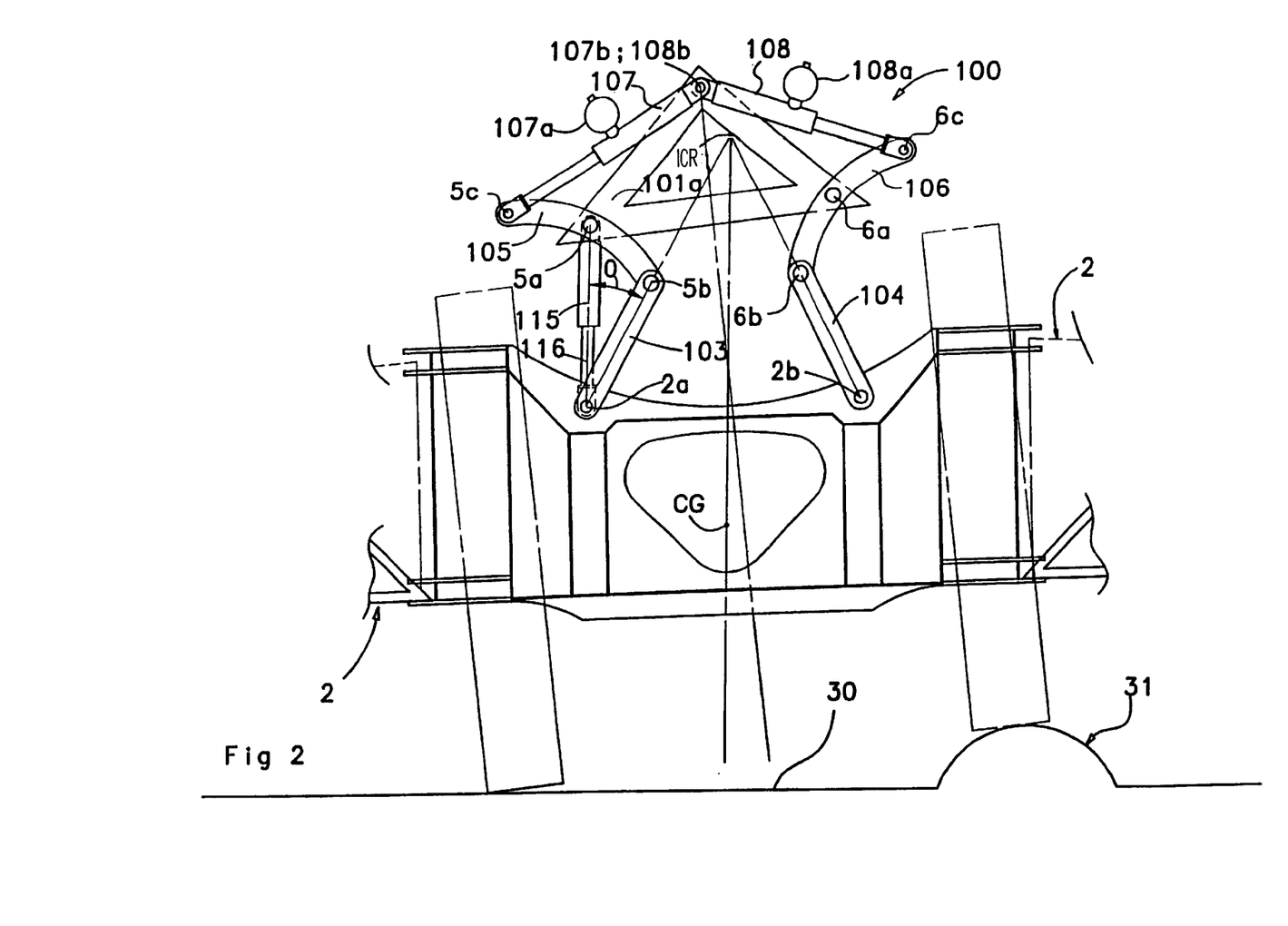
FIG. 2 depicts a second embodiment of a suspension device according to the invention.

FIG. 2 shows another embodiment of a suspension device (100). Therein, the adjusting members (107, 108) are, for example, articulated to the same point of articulation. The articulations (107b, 108b) are therefore, for example, coincident.

In this embodiment, it will also be seen that the means for damping the movements of the boom (2) additionally comprise at least one additional hydraulic damper (115) mounted between the chassis (101a) and said boom (2). Said hydraulic damper (115) is orientated angularly with respect to one (103) of the link rods (103, 104). As a preference, the hydraulic damper (115) is mounted between the articulation (2a) connecting said link rod (103) to the boom (2) and the articulation (5a) connecting the corresponding rocker arm (105) to the chassis (101a). The hydraulic damper (115) comprises a piston (116) connected to the boom (2) and the stroke of which is damped. The hydraulic damper (115) consists, for example, of a hydraulic ram comprising an internal damping system. The latter makes it possible to define a degree of damping depending on the stroke of said piston (116).

The way in which the hydraulic damper (115) is mounted makes it possible to define an angle (O) with the corresponding link rod (103) The angle (O) then represents the stroke of the piston (116) and increases with a shortening of the hydraulic damper (115). Conversely, a reduction in the angle (O) corresponds to a lengthening of the hydraulic damper (115). Thus, a vertical movement of the boom (2) by a given amount will be damped to an extent that is determined by the value of the angle (O). By way of a preferred example, the hydraulic damper (115) provides a level of damping which increases with an increase in the angle (O). The angle (O) between the hydraulic damper (115) and the corresponding link rod (103) therefore reflects the given dynamic behavior of the boom (2).

When the value of the angle (O) is small, the damping of the boom (2) is reduced. By contrast, the instantaneous center of rotation (ICR) of the boom (2) is further away from the center of gravity (CG) thereof, and this reduces the instability of the see-saw effect of said boom (2)

Thus, the user, confronted with uneven ground (30) liable to transmit jolts to the boom (2) via the chassis (1a), will favor a setting with a large angle (O) or, in other words, with a small separation between the center of gravity (CG) of the boom (2) and the instantaneous center (ICR) thereof.

When there are no unevennesses (31), the user will, on the other hand, derive greater benefit from favoring a setting with a small angle (O) or, in other words, with a large separation between the center of gravity (CG) of the boom (2) and the instantaneous center (ICR) thereof. Specifically, the greater separation between the center of gravity (CG) of the boom (2) and the instantaneous center of rotation (ICR) thereof increases, under dynamic conditions, the restoring moment applied to the boom (2) so as to reduce the force needed to return said boom (2) to its normal position. A setting of this kind may, in particular, be suitable for undulating terrain without unevennesses.

Advantageously, the suspension device (100) may also have mechanisms for locking the boom (2), for example ones similar to the locking mechanisms (11, 12), which may or may not be activated.

It will be understood that the hydraulic damper (115) could also be mounted between the articulation (2b) connecting the link rod (104) to the boom (2) and the articulation (6a) connecting the corresponding rocker arm (106) to the chassis (101a). It would also be perfectly conceivable for a hydraulic damper (115) to be associated with each link rod (103, 104).

The suspension device (1; 100) according to the invention exhibits a certain number of advantages.

Specifically, the dynamic behavior of the boom (2) can be influenced by the user by altering the static separation between the center of gravity (CG) of said boom (2) and the instantaneous center of rotation (ICR) thereof. This is achieved by acting on the angle between the two link rods (3, 4; 103, 104) defined by the imaginary straight lines passing respectively through the centers of the articulations (2a, 5b) and (2b, 6b). In the embodiment of FIG. 2, acting on the angle between the two link rods (103, 104) is equivalent to acting on the angle (O).

Thus, by reducing the angle between the two link rods (3, 4; 103, 104), the restoring moment to which the boom (2) is subjected is increased, and this has the effect of increasing the stability of the boom (2) with respect to lateral accelerations and of reducing the rolling phenomenon. The boom (2) is also kept more parallel to the ground (30), and this encourages good behavior on slopes. On the other hand, in this configuration, the boom (2) is more sensitive to vertical accelerations caused by unevennesses (31) of the ground (30). The adjusting members (7, 8; 107, 108) and/or the (or any) hydraulic damper(s) (115) are, however, capable of sufficiently damping said accelerations. A setting of this kind is suitable, for example, for inclined or undulating terrain with few or no unevennesses (31).

Increasing the angle between the two link rods (3, 4; 103, 104) does, however, decrease the restoring moment to which the boom (2) is subjected and therefore makes the boom (2) more sensitive to the phenomenon of rolling or to the inclination of the ground (30). The boom (2) is no longer kept parallel to the ground (30) as effectively as it was with a small angle. By contrast, vertical accelerations are better absorbed and pendulum-type behavior of the suspension device (1; 100) is encouraged. In this exemplary set-up, the boom (2) rather has a tendency to maintain a horizontal position. This is therefore particularly advantageous in the case of approximately flat and possibly bumpy terrain.

The damping can thus be varied according to the convergence of the link rods (3, 4; 103, 104) and therefore according to the position of the instantaneous center of rotation (ICR) of the boom (2) with respect to the center of gravity (CG) thereof. The advantage of the suspension device (1; 100) according to the invention lies in particular in the possibility, under static conditions (with the sprayer stationary), of choosing said position of the instantaneous center of rotation (ICR), this position therefore dictating the dynamic behavior of the boom (2) during spraying operations.

Thus, according to the predominance of certain characteristics of the terrain or of the ground (30) on which the sprayer is to work, the user is able to select a given dynamic behavior for the boom (2).

It is also possible to take account of the speeds of forward travel, some of these being liable to accentuate the accelerations or jolts experienced by the boom (2).

The behavior of the boom (2) could also advantageously be controlled by a computer, in the memory of which the characteristics of the terrain over which the sprayer would have to move had been stored beforehand.

The use of oleopneumatic rams also makes it possible, in a particularly effective way, to attenuate the accelerations, particularly the vertical accelerations, which result from a jolt or abrupt movement of the boom (2).

The suspension device (1; 100) according to the invention therefore makes it possible to obtain optimum and effective damping.

It also has the advantage that its dynamic behavior is close to the behavior of a conventional pendular suspension or a link rod suspension, according to the adjustment, when static, of the position of the instantaneous center of rotation (ICR) of the boom (2) with respect to the center of gravity (CG) thereof.

The rocker arms (5, 6; 105, 106) are associated with elastically deformable means, the return force of which encourages the boom (2) to quickly return to a normal position. The elastically deformable means consist of the adjusting members (7, 8; 107, 108) of the accumulator ram type (7a, 8a; 107a, 108a).

The suspension device according to the invention is therefore particularly advantageous insofar as it makes it possible to reduce the phenomenon of the rolling of the boom (2) when traveling across fields.

In the various embodiments which have just been described, the two link rods (3, 4; 103, 104) are each articulated to the boom (2) while the two rocker arms (5, 6; 105, 106) are each articulated to the chassis (1a; 101a) and are additionally connected thereto via he adjusting members (7, 8; 107, 108). It will, however, be understood that, in the invention, the two link rods (3, 4; 103, 104) can just as well each be articulated to the chassis (1a; 101a). In this case, the two rocker arms (5, 6; 105, 106) would be articulated to the boom (2) and would additionally be connected thereto via the adjusting members (7, 8; 107, 108).

The various embodiments which have just been described all relate to a sprayer for spraying treatment products of the plant protection type. It will, however, be understood that the invention also relates to all types of agricultural appliance capable of spreading products, such as fertilizer spreaders for example.

Various modifications may also be made to the embodiments described, particularly as far as the assembly, association or combination of various elements are concerned or as regards replacing these elements with equivalent elements, without in any way departing from the scope of the present invention. In particular, members may be transposed from one of the embodiments to another.

What is claimed is:

1. A suspension device for a boom of a product-spreading agricultural appliance, including elements for mounting said boom on a chassis of said appliance, wherein said suspension device comprises:

said means for damping movements of said boom; and adjusting members acting on said elements for mounting said boom so as to vary a position of an instantaneous center of rotation of said boom with respect to a center of gravity thereof, by altering a separation between said center of gravity and said instantaneous center of rotation, said instantaneous center of rotation being at a higher elevation than said center of gravity.

2. The suspension device as claimed in claim 1, wherein said adjusting members bring said boom into a given angular orientation with respect to said chassis to make sure that said boom is at least approximately parallel to a ground that is inclined with respect to horizontal.

3. The suspension device as claimed in claim 1, wherein said elements for mounting said boom comprise two link rods, each of said two link rods being articulated to said boom or to said chassis at a link rod point of articulation, and said two link rods converging to form a geometric location of said instantaneous center of rotation.

4. The suspension device as claimed in claim 3, wherein said two link rods converge upwardly.

5. The suspension device as claimed in claim 3, wherein said elements for mounting said boom further comprise two rocker arms, each of said two rocker arms being articulated to said chassis or to said boom at a rocker arm point of articulation, each of said two rocker arms having two ends so that a first end of said two ends of each of said two rocker arms is articulated to a corresponding one of said two link rods at a point of articulation, while a second end of said two ends of each of said two rocker arms is connected to said chassis or to said boom via a corresponding one of said adjusting members.

6. The suspension device as claimed in claim 5, wherein each of said two rocker arms is articulated to said chassis or to said boom at an approximately central respective point of articulation.

7. The suspension device as claimed in claim 5, wherein each of said two rocker arms has a roughly cranked shape.

8. The suspension device as claimed in claim 1, further comprising elastically deformable means having a return force which encourages said boom to return to a normal position.

9. The suspension device as claimed in claim 8, wherein said elastically deformable means comprise are said adjusting members.

10. The suspension device as claimed in claim 1, wherein said means for damping said movements of said boom comprise said adjusting members.

11. The suspension device as claimed in claim 1, wherein each of said adjusting members comprises an oleopneumatic ram.

12. The suspension device as claimed in claim 1, wherein said means for damping said movements of said boom comprise at least one hydraulic damper mounted between said chassis and said boom.

13. The suspension device as claimed in claim 12, wherein said hydraulic damper is mounted between a point of articulation connecting one of two link rods to said boom or to said chassis and a point of articulation connecting one of two rocker arms to said chassis or to said boom.

14. The suspension device as claimed in claim 1, further comprising locking mechanisms allowing said boom to be locked in any position.

15. The suspension device as claimed in claim 1, further comprising limiting mechanisms which allow said boom to be locked in a raised position.

16. A product-spreading agricultural appliance equipped with a chassis, a boom for spreading products and a suspension device for suspending said boom on said chassis, wherein said suspension device is a suspension device as claimed in claim 1.

17. A suspension device for a boom of a product-spreading agricultural appliance, which includes elements for mounting said boom on a chassis of said appliance, wherein said suspension device comprises:

structure configured to damp movements of said boom; and adjusting members acting on said elements for mounting said boom so as to vary a position of an instantaneous center of rotation of said boom with respect to a center of gravity thereof, by altering a separation between said center of gravity and said instantaneous center of rotation, said instantaneous center of rotation being at a higher elevation than said center of gravity.

18. A suspension device for a boom of a product-spreading agricultural appliance, which includes elements for mounting said boom on a chassis of said appliance, wherein said suspension device comprises:

means for damping movements of said boom;

adjusting members acting on said elements for mounting said boom so as to vary a position of an instantaneous center of rotation of said boom with respect to a center of gravity thereof, by altering a separation between said center of gravity and said instantaneous center of rotation, said instantaneous center of rotation being at a higher elevation than said center of gravity;

wherein said elements for mounting said boom comprise two link rods, each of said two link rods being articulated to said boom or to said chassis at a link rod point of articulation, and said two link rods converging to form a geometric location of said instantaneous center of rotation; and wherein said elements for mounting said boom further comprise two rocker arms, each of said two rocker arms being articulated to said chassis or to said boom at a rocker arm point of articulation, each of said two rocker arms having two ends so that a first end of said two ends of each of said two rocker arms is articulated to a corresponding one of said two link rods at a point of articulation, while a second end of said two ends of each of said two rocker arms is connected to said chassis or to said boom via a corresponding one of said adjusting members.

19. A suspension device for a boom of a product-spreading agricultural appliance, which includes elements for mounting said boom on a chassis of said appliance, wherein said suspension device comprises:

structure configured to damp movements of said boom;

adjusting members acting on said elements for mounting said boom so as to vary a position of an instantaneous center of rotation of said boom with respect to a center of gravity thereof, by altering a separation between said center of gravity and said instantaneous center of rotation, said instantaneous center of rotation being at a higher elevation than said center of gravity;

wherein said elements for mounting said boom comprise two link rods, each of said two link rods being articulated to said boom or to said chassis at a link rod point of articulation, and said two link rods converging to form a geometric location of said instantaneous center of rotation; and wherein said elements for mounting said boom further comprise two rocker arms, each of said two rocker arms being articulated to said chassis or to said boom at a rocker arm point of articulation, each of said two rocker arms having two ends so that a first end of said two ends of each of said two rocker arms is articulated to a corresponding one of said two link rods at a point of articulation, while a second end of said two ends of each of said two rocker arms is connected to said chassis or to said boom via a corresponding one of said adjusting members.

20. A suspension device for a boom of a product-spreading agricultural appliance, which includes elements for mounting said boom on a chassis of said appliance, wherein said suspension device comprises:

structure configured to damp movements of said boom;

adjusting members acting on said elements for mounting said boom so as to vary a position of an instantaneous center of rotation of said boom with respect to a center of gravity thereof, by altering a separation between said center of gravity and said instantaneous center of rotation, said instantaneous center of rotation being at a higher elevation than said center of gravity;

wherein said means for damping said movements of said boom comprise at least one hydraulic damper mounted between said chassis and said boom; and wherein said hydraulic damper is mounted between a point of articulation connecting one of two link rods to said boom or to said chassis and a point of articulation connecting one of two rocker arms to said chassis or to said boom.

* * * * *